US009128517B2

(12) United States Patent
Tanaka

(10) Patent No.: US 9,128,517 B2
(45) Date of Patent: Sep. 8, 2015

(54) VEHICULAR TERMINAL WITH INPUT SWITCHING

(71) Applicant: DENSO CORPORATION, Kariya, Aichi-pref. (JP)

(72) Inventor: Hiroyuki Tanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 68 days.

(21) Appl. No.: 13/914,718

(22) Filed: Jun. 11, 2013

(65) Prior Publication Data
US 2013/0328768 A1 Dec. 12, 2013

(30) Foreign Application Priority Data

Jun. 12, 2012 (JP) ................... 2012-133124

(51) Int. Cl.
G09G 5/00 (2006.01)
G06F 3/01 (2006.01)
G01C 21/36 (2006.01)
G06F 3/16 (2006.01)

(52) U.S. Cl.
CPC .............. *G06F 3/01* (2013.01); *G01C 21/3608* (2013.01); *G01C 21/3611* (2013.01); *G06F 3/167* (2013.01)

(58) Field of Classification Search
CPC .. G01C 21/3608; G01C 21/3611; G06F 3/01; G06F 3/167
USPC ......................................................... 345/156
See application file for complete search history.

(56) References Cited

U.S. PATENT DOCUMENTS 8,280,742 B2 10/2012 Hirai et al.
2004/0176906 A1* 9/2004 Matsubara et al. ........... 701/200
2005/0278110 A1* 12/2005 Horio ............................ 701/200
2009/0171529 A1* 7/2009 Hayatoma ...................... 701/36
2011/0173002 A1* 7/2011 Fujii et al. .................... 704/246

* cited by examiner

Primary Examiner — Long D Pham
(74) Attorney, Agent, or Firm — Posz Law Group, PLC

(57) ABSTRACT

A vehicular terminal receives an input of a condition via an input unit, such that the input may be performed via manual operation or voice recognition. An input restriction function restricts a reception of the condition by manual operation during vehicle travel. The vehicular terminal determines whether an input reception restriction function is in effect during the reception of the condition by manual operation via the input unit. When it is determined that the input reception restriction function is in, the vehicular terminal switches an input method for reception of the input of the condition from manual operation to voice recognition, thereby allowing a continuous reception of the condition.

9 Claims, 5 Drawing Sheets

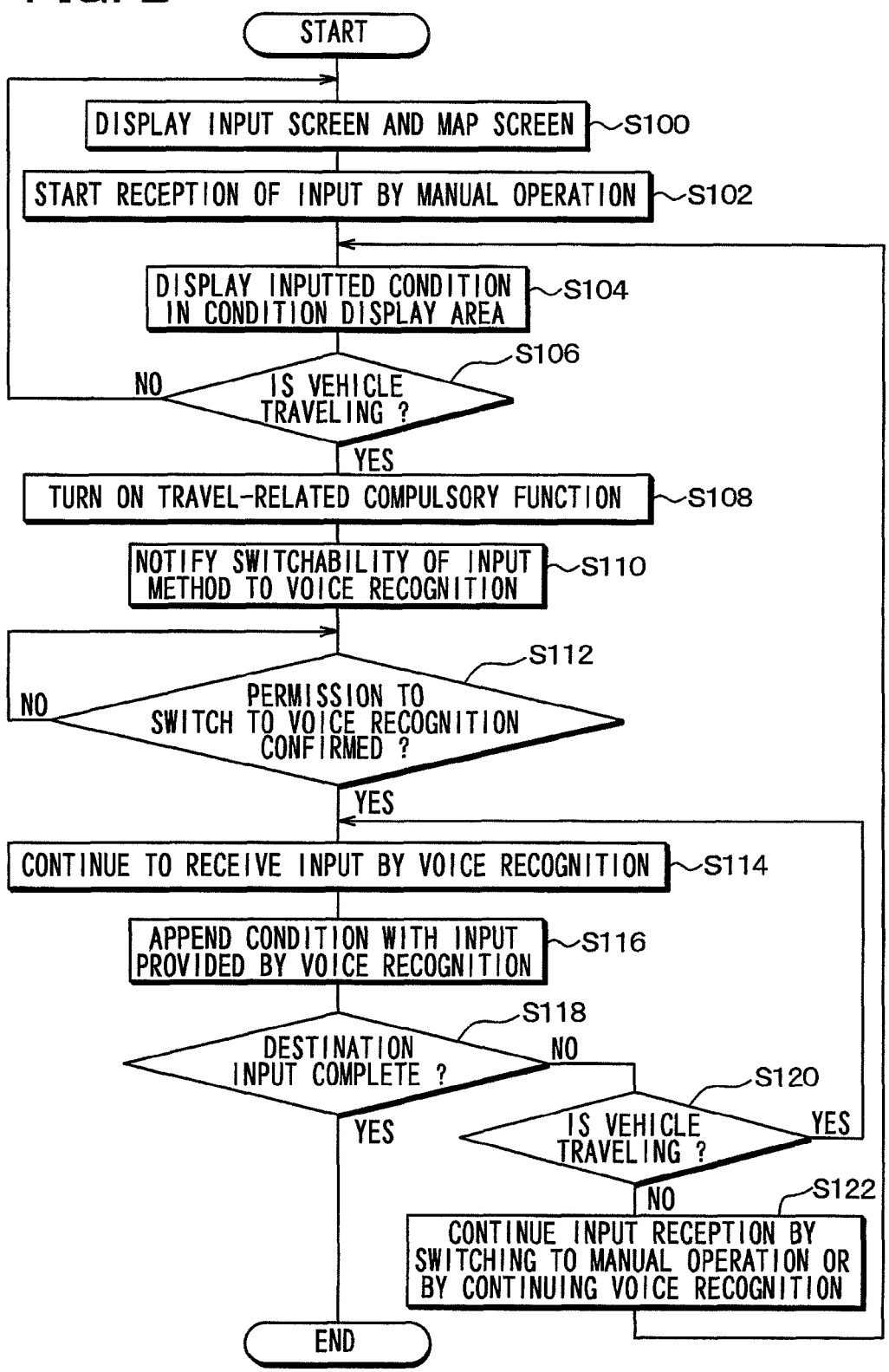

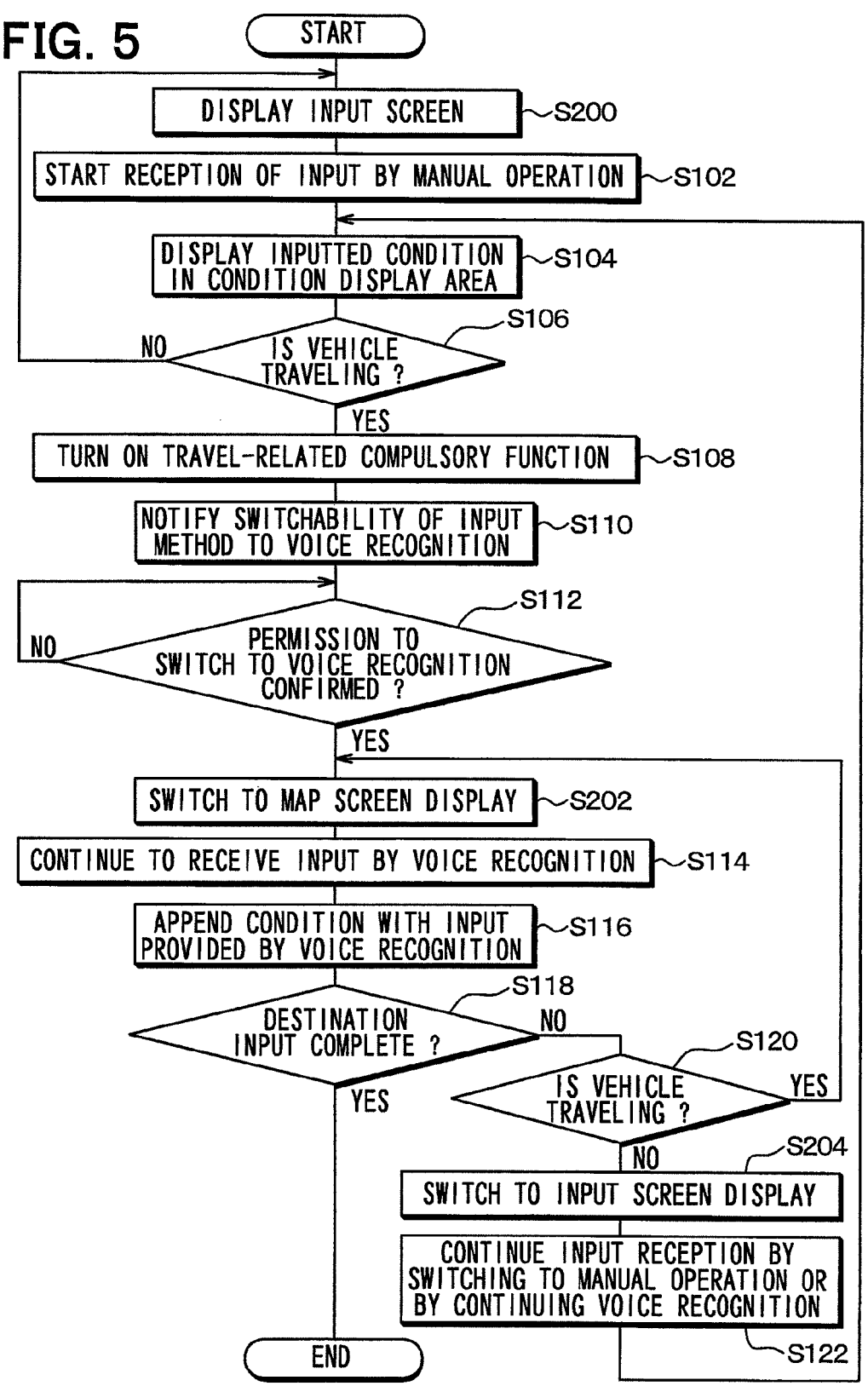

VEHICULAR TERMINAL WITH INPUT SWITCHING

CROSS REFERENCE TO RELATED APPLICATION

The present application is based on and claims the benefit of priority of Japanese Patent Application No. 2012-133124 filed on Jun. 12, 2012, the disclosure of which is incorporated herein by reference.

TECHNICAL FIELD

The present disclosure generally relates to a vehicular terminal having an input restriction function that restricts reception of a condition that is inputted by a manual operation during vehicle travel.

BACKGROUND

Conventionally, various forms of an input device for a mobile device have been provided. In particular, the input device may receive an input from a user via a manual operation or voice recognition or both. For example, Japanese patent No. 4,805,279 (U.S. Pat. No. 8,280,742) discloses such an input device.

Some vehicular terminals, such as a navigation apparatus, may have an input restriction function (i.e., a travel-related compulsory function) that restricts some operations performed as a manual operation by a user, such as a destination setting, during vehicle travel in order to prevent the driver from being distracted. On the other hand, certain operations may not be restricted. For example, an operation of a "current position" button for displaying a subject vehicle mark on a map may not be restricted even when such operation is performed by the user during vehicle travel. However, an operation for inputting a search condition for a destination search will most likely be restricted during vehicle travel.

In the event the vehicle stops at a red signal and the driver starts inputting a condition for performing a destination search by manual operation, the driver may not be able to complete the manual operation before the light turns green. In other words, if the vehicle starts to travel before the input of the condition is complete, the travel-related compulsory function kicks in (i.e., is put in effect) and the destination search screen is kept "frozen" on the display, such that the condition may not be inputted.

In such a case, if the driver presses the "current position" button, a map screen will be displayed. However, search conditions that were inputted before the travel-relate compulsory function began may be discarded. Therefore, the driver has to re-input the search conditions from scratch after stopping the vehicle, which is inconvenient for the driver.

SUMMARY

In an aspect of the present disclosure, a vehicular terminal includes an input unit, an input reception restriction function, an effectiveness determination unit, and a first input reception switcher. The input unit receives an input from an input method, which includes a manual operation input performed by a manual operation and a voice recognition input performed by a voice recognition process. The input restriction function restricts a reception of a condition by the manual operation input during a travel of a vehicle, and the effectiveness determination unit determines whether the input restriction function is put in effect during reception of the condition by the manual operation input. The first input reception switcher switches the input method from the manual operation input to the voice recognition input to continue reception of the condition from the input unit when the effectiveness determination unit determines the input restriction function is in effect.

According to such configuration, whether the input restriction function is put in effect during the reception of the condition by the manual operation is determined. If it is determined that the input restriction function is put in effect during the reception of the condition by the manual operation, the input method is switched from manual operation to voice recognition to continue the reception of the condition. Therefore, the operability and the convenience of the manually-performed input operation are improved even when the input restriction function is put in effect during such an input by the manual operation.

BRIEF DESCRIPTION OF THE DRAWINGS

Other objects, features and advantages of the present disclosure will become more apparent from the following detailed description disposed with reference to the accompanying drawings, in which:

FIG. 2 is a flowchart of a process performed by a control unit of the vehicular terminal in a first embodiment;

FIG. 5 is a flowchart of a process performed by the control unit of the vehicular terminal in a second embodiment.

DETAILED DESCRIPTION

First Embodiment

Figure 1:
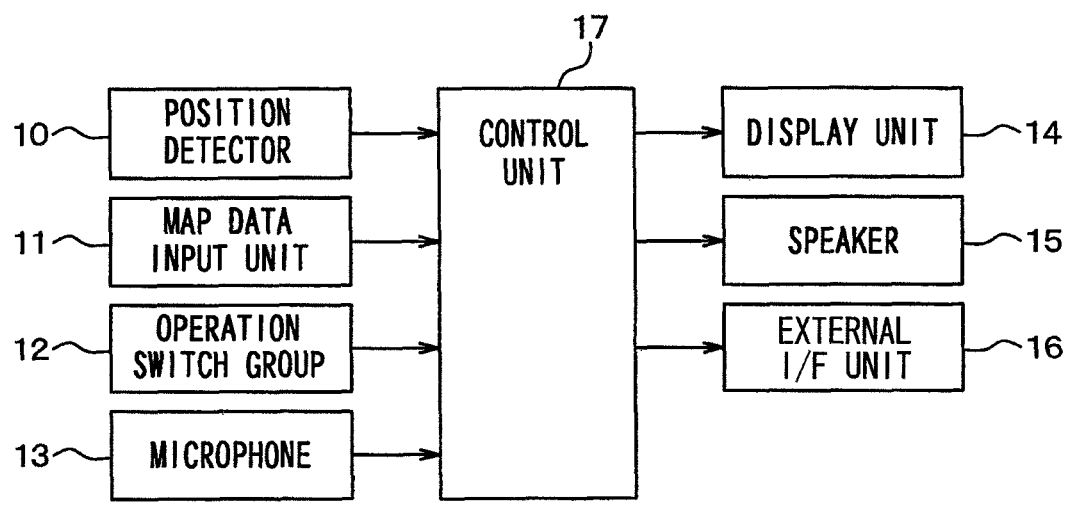
FIG. 1 is a block diagram of a vehicular terminal of the present disclosure.

A configuration of a vehicular terminal in the first embodiment of the present disclosure is shown in FIG. 1. The vehicular terminal is installed in a vehicle as a navigation apparatus. The navigation apparatus includes a position detector 10, a map data input unit 11, an operation switch group 12, a microphone 13, a display unit 14, a speaker 15, an external (I/F) unit 16 for external devices, and a control unit 17.

The position detector 10 may include, for example, a geomagnetism sensor, a gyroscope, a range sensor, and a GPS receiver. The position detector 10 provides information that identifies a position and a travel direction of the vehicle to the control unit 17.

The map data input unit 11 is a device that reads data from a record media and outputs the data to the control unit 17. Specifically, the map data input unit 11 reads map data from the record media. The map data includes a map matching data to improve a position detection accuracy, a background data for map display, and a facility data, which is in regards to various types of facilities. The record media, which has the map data, may be, for example, a DVD, a hard disk drive, or a flash memory.

The operation switch group 12 includes, for example, a mechanical switch set up around a display panel of the display unit 14 and a touch switch that is disposed on top of the display panel of the display unit 14. The operation switch group 12 outputs a signal to the control unit 17 according to an operation of the switch (i.e., the mechanical switch and/or touch switch) by the user.

The microphone 13 collects sound in a vehicle compartment, and based on the collected sound, outputs a signal to the control unit 17.

The display unit 14 includes a liquid-crystal display panel, and displays an image according to an image signal that is provided by the control unit 17. The navigation apparatus of the present embodiment is connected to two display units 14.

The speaker 15 outputs a voice sound according to a voice signal that is provided by the control unit 17. The external (I/F) unit 16 is an interface used for exchanging data with the external devices.

The control unit 17 is a computer that has a CPU, a RAM, a ROM, and an input-output (I/O). The CPU performs various processes according to a program stored in the ROM.

The control unit 17 may perform various processes such as: a current position identification process, a map display process, a voice recognition process, a destination search process, a route search process, and a guidance process. The current position identification process identifies a current position of the vehicle based on information that is provided by the position detector 10. The map display process displays a current position mark on a map to indicate the current position of the vehicle. The voice recognition process recognizes a vocabulary (i.e., a keyword) from a voice that is provided by the microphone 13. The destination search process searches for a destination based on an input of a condition that is received by the voice recognition process or by an operation of, for example, the touch switch (i.e., by a manual operation), where the manual operation of the touch switch and voice recognition by the voice recognition process are considered input methods for inputting the condition. The route search process searches for an optimum route between a start point and a destination. The guidance process provides a travel guidance according to a searched route.

The navigation apparatus of the present embodiment is capable of searching for a destination by various methods, such as an alphabetical search, a postal code search, a telephone number search, a genre search, and an address search. For example, the alphabetical search can search for a destination, i.e., a place or a facility, that includes inputted characters, and the postal code search can search for an area that has the inputted postal code numbers assigned thereto.

The navigation apparatus may also include a "sound recognition start" button. When the sound recognition start button is operated by the user, the navigation apparatus displays on the display unit a voice recognition screen, which has various operation commands to start a voice recognition process. The user is prompted to speak various operation commands, in response to a message, such as "Please speak a command"<<beep>>. The navigation apparatus may receive an input, by recognizing a vocabulary other than the operation commands.

The navigation apparatus also has an input restriction function (i.e., a travel-related compulsory function) that restricts the reception of the condition by a manual operation during the travel of the vehicle.

For instance, an operation of the "current position" button to display the current position mark on top of the map screen that shows a map around the current position of the vehicle will not be restricted regardless of a travel condition of the vehicle. However, reception of the condition by the manual operation for inputting a search condition for a destination search will be prohibited by the input restriction function when the vehicle is traveling (i.e., during vehicle travel), but may not be restricted when the vehicle is stopped (i.e., during vehicle stop).

A flowchart of a process performed by the control unit 17 is shown in FIG. 2. The navigation apparatus of the present embodiment is put in an operation state when an ignition switch is turned to an ON state. The process of FIG. 2 is performed during a vehicle stop and when the user initiates a destination search according to a menu screen.

Figure 3A:
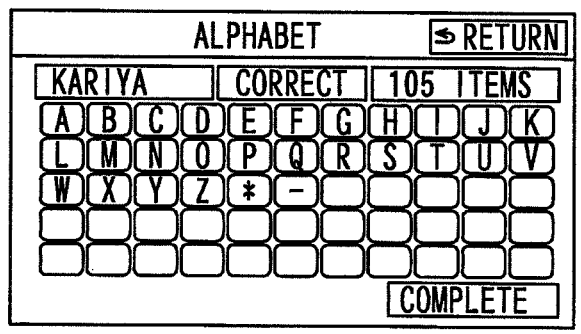
FIGS. 3A and 3B are illustrations of screens displayed during manual operation on two display units of the first embodiment.
Figure 3B:
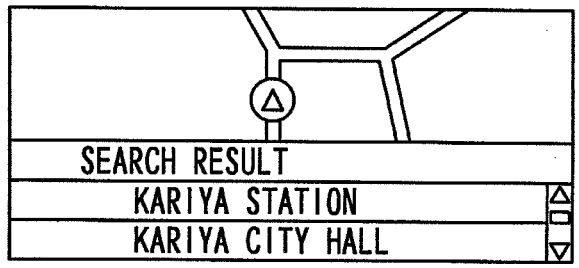

The control unit 17 first displays a map screen and an input screen for inputting the condition at S100. With reference to FIGS. 3A and 3B, the input screen is displayed on one display unit 14, and the map screen is displayed on the other display unit 14. In the present embodiment, the input screen and the map screen are displayed on different display units 14 to allow the user to confirm a travel position of the vehicle even during the input of the condition for the destination search.

In this example, the destination search is performed as the alphabetical search. On an alphabet input screen, character buttons of "a" "b" "c" etc. plus other special characters such as "*" "–" and the like are displayed, together with a "correct" button for correcting the condition, a "complete" button for indicating a completion of the input, and a condition display area that is used for displaying the inputted characters of the search condition.

The control unit 17 then starts reception of the input via the manual operation of the input screen at S102. Specifically, the control unit 17 receives the input of the condition by manual operation based on a signal that is provided by the touch switch of the operation switch group 12.

The control unit 17 displays the condition being inputted in the condition display area at S104. For example, upon receiving an input of "K" "A" "R" "I" "Y" "A," the condition "KARIYA", which is the name of a city, is displayed in the condition display area. At such input, a search result of the facilities that include "KARIYA" in their names is displayed as a list on the map screen, i.e., on one of the two display units 14. For example, an item "Kariya Station" and an item "Kariya City Hall" are displayed.

The control unit 17 then determines whether the vehicle is traveling at S106. In particular, based on a vehicle speed signal provided by the range sensor of the position detector 10, the control unit 17 determines whether the vehicle is traveling.

When the vehicle is stopped (S106:NO), the control unit 17 returns to S100. In such a case, the user can continue to input the condition.

When the vehicle is in a traveling state (S106:YES), and the control unit 17 turns on the travel-related compulsory function at S108. At such time, reception of the condition by the manual operation is prohibited. In other words, the condition may not be inputted via the manual operation.

The control unit 17 then notifies the user that the input of the condition can be continued by switching the input method from the manual operation to the voice recognition process at S110. Specifically, the condition can be continued to be inputted by the voice recognition process.

Figure 4A:
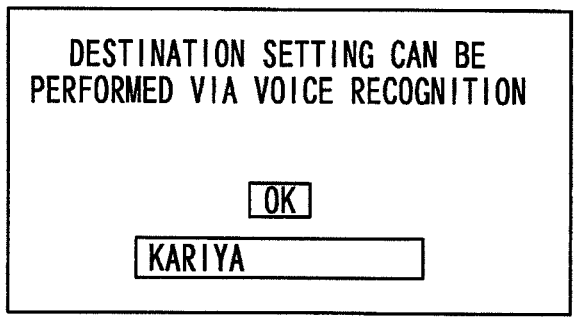
FIGS. 4A and 4B are illustrations of screens displayed during an input restriction function on the two display units of the first embodiment.
Figure 4B:
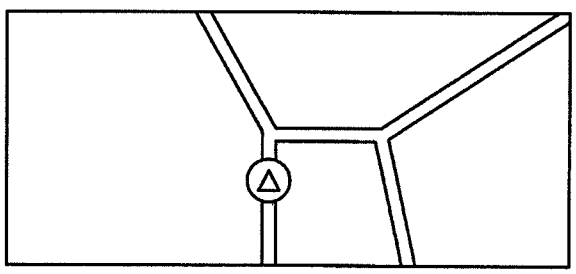

In particular, with reference to FIGS. 4A and 4B, the control unit 17 may display a message, such as "destination setting can be performed via voice recognition", on one of the two display units 14, such as the display unit displaying the destination search screen. Along with the message, the control unit 17 may display a confirmation button "OK" to confirm the user's intention to continue inputting the condition via the voice recognition process. The other display unit continues to display the map screen.

Further, the portion of the condition that has already been inputted before the travel-related compulsory function started, continues to be shown in the condition display area. The confirmation button "OK" is treated as a button that can be operated via the manual operation even when the travel-related compulsory function is in effect.

Based on whether the confirmation button "OK" has been operated by the user, the control unit 17 determines whether the user has permitted switching to voice recognition at S112.

When the confirmation button "OK" has not been selected or operated (S112:NO), the control unit 17 repeats the determination of S112. When the confirmation button "OK" has been selected by the user (S112:YES), the control unit 17 switches to the voice recognition process to continue inputting the condition at S114. Specifically, the input of the condition via the manual operation is finished, and the voice recognition process is started to continue reception of the input of the condition.

The control unit 17 displays the condition in the condition display area by appending the existing condition (i.e., condition before the switch) with inputs from the voice recognition (i.e., a voice-recognized condition) at S116. Specifically, the input recognized by the voice recognition is added to the condition already received via the manual operation, and the condition is displayed in the condition display area.

The control unit 17 then determines whether the condition for the destination input is completely inputted at S118. For example, the control unit 17 determines that the destination input is complete, when the user utters "Complete", which represents an execution instruction of completion of the input, and when such utterance is voice-recognized. In other words, the destination input is complete based on a determination of whether the user's utterance of "Complete" is voice-recognized.

When the destination input is not complete (S118:NO), the control unit 17 determines whether the vehicle is traveling based on the vehicle speed signal at S120. If the vehicle is traveling (S120:YES), the control unit 17 returns to S114 and continues to receive the input of the condition by voice recognition.

If the vehicle has come to a stop (S120:NO), the control unit 17 continues to receive the input by switching to the manual operation or by maintaining the voice recognition at S122. The control unit 17 returns to S104, and further continues receiving the input of the condition by the manual operation or by the voice recognition.

After the completion of the destination input (S118:YES), the control unit 17 concludes the process of FIG. 2. After the completion of the destination input in such manner, the control unit 17 searches for a facility that matches the condition inputted from the destination input upon receiving a search instruction from the user, and displays the search result on one of the display units 14.

According to the above configuration, the vehicular terminal has an input unit and an input restriction function. The input unit receives an input via the input method, which may include a manual operation input performed by a manual operation and a voice recognition input performed by the voice recognition process. The input restriction function restricts reception of the condition inputted by the manual operation input during vehicle travel. The vehicular terminal determines whether the input restriction function is put in effect during reception of the condition by the manual operation input, and switches the manual operation input to the voice recognition input in order to continue reception of the input of the condition when the input restriction function is in effect, thereby achieving an improved user convenience.

Further, when it is determined that the input restriction function in effect, the user is notified via a notification unit that a continuation of the condition input is enabled by switching the input method for inputting the condition from the manual operation input to the voice recognition input. Therefore, the user can easily recognize that the condition can be inputted via the voice recognition input.

During the notification to the user by the notification unit, the user may be asked to confirm switching from the manual operation input to the voice recognition input. If it is confirmed that the user would like to switch to the voice recognition input, the vehicular terminal switches to the voice recognition input, so that the user may continue to input the condition. Therefore, the unintended switching of the input method is prevented.

After switching from the manual operation input to the voice recognition input, it is determined whether the input restriction function is invalidated or, in other words, no longer in effect. When it is determined that the input restriction function is invalidated, reception of the input is continued by switching the input method from the voice recognition input to the manual operation input or by continuing the voice recognition input. Therefore, when the input restriction function is no longer in effect, the user can continue inputting the condition either by the manual operation or by the voice recognition (i.e., the user can switch back to the manual operation input after switching to the voice recognition input).

Based on the present embodiment, the navigation apparatus includes a plurality of display units. The input screen for receiving the manual operation input and/or the voice recognition input is displayed on one of the plurality of display units, and the map screen is displayed on the other one of the plurality of display units separately. Therefore, the user can recognize the current position of the vehicle on the map screen even when inputting the condition.

Second Embodiment

The configuration of a vehicular terminal in the second embodiment of the present disclosure is different from the first embodiment, such that the second embodiment has one display unit 14. The process performed by the control unit 17 of the present embodiment is shown in FIG. 5. In the first and second embodiments like parts have like numbers, and the following mainly describes the difference between the two embodiments.

When the user initiates the destination search according to a menu screen, instead of displaying the input screen and the map screen, the control unit 17 displays the input screen on the display unit 14 at S220. Subsequently, the control unit 17 proceeds to S102, and the steps of S102 to S112 are the same as FIG. 2 of the first embodiment.

Figure 6A:
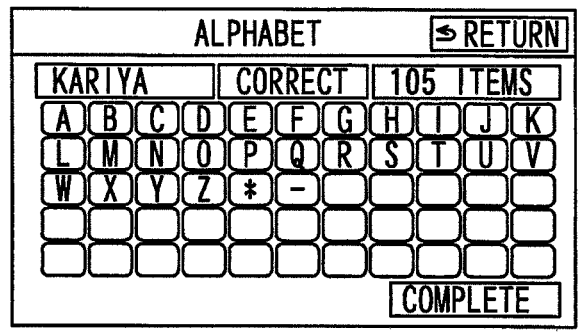
FIGS. 6A, 6B, 6C are illustrations of screens displayed on a display apparatus of the second embodiment.
Figure 6B:
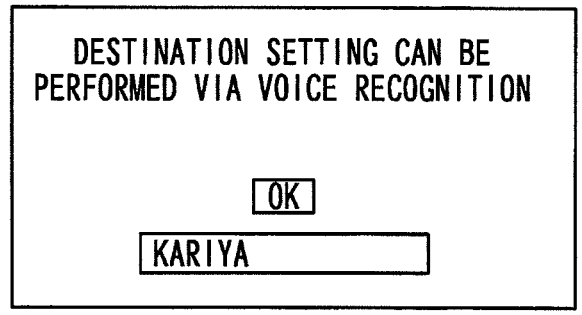
Figure 6C:
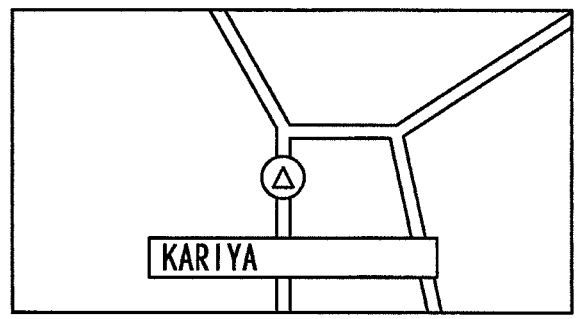

Further, when the confirmation button "OK" has been selected by the user (S112:YES), instead of switching to the voice recognition input to continue the input of the condition at S114, the control unit 17 first switches the display of the display unit 14 to the map screen display at S202, then switches to the voice recognitions input to continue the input of the condition at S114. In particular, with reference to FIGS. 6A, 6B, and 6C, the input screen display of FIG. 6A is displayed at S200, a message and the confirmation button for continuing input via voice recognition, as shown in FIG. 6B, is displayed at S112, and once the confirmation button is operated, the map screen display of FIG. 6C is displayed at S202. The map screen display of FIG. 6C includes the condition display area, which shows the condition being inputted.

In the present embodiment, when the display of the display unit 14 is switched to the map screen and the input method is switched from the manual operation to the voice recognition, the input received by the voice recognition is appended with the condition already entered before the input restriction function is put in effect and the condition is displayed in the condition display area on the map screen (FIG. 6C).

When the input restriction function is put in effect and the vehicle stops before the completion of the destination input (S120:NO), the control unit 17 switches the display of the display unit 14 from the map screen display to the input screen display at S204. Subsequently, to continue reception of the condition, the control unit 17 either switches the input method to the manual operation or maintains the input method as the voice recognition at S122.

According to the above configuration, the input screen for receiving the manual operation input and/or the voice recognition input is displayed on the display unit 14, and when it is determined that the input restriction function is in effect, the display of the display unit is switched from the input screen to the map screen. Therefore, a "screen-freeze" situation in which the display of the input screen is kept in a hold state (i.e., the input screen is kept on the display unit without allowing display to be switched to another screen) is prevented. Thus, the user can recognize the current position of the vehicle by viewing the map screen.

Further, if a condition that is received as an input by the manual operation before the input restriction function is put in effect exists (i.e., a during-input condition), the condition is displayed in the condition display area of the input screen. When the display of the display unit is switched to the map screen and the input method is switched from the manual operation input to the voice recognition input, the input received by the voice recognition is appended with the condition that is received before the input restriction function is put in effect and the condition is displayed in the condition display area on the map screen.

Accordingly, the user can use the display of the condition display area to recognize the condition already entered before the input restriction function, and to continue the input of the condition by the voice recognition input while confirming the accuracy of the voice recognition. Since the display of the display unit is switched to the map screen and the input received by the voice recognition is displayed in the condition display area on the map screen, even when the navigation apparatus has only one display unit, the condition inputted by the voice recognition can be continuously performed while the user recognizes the current position of the vehicle on the map screen.

Other Embodiments

Although the present disclosure has been fully described in connection with the preferred embodiment with reference to the accompanying drawings, it is to be noted that various changes and modifications will become apparent to those skilled in the art.

That is, the present disclosure is not limited to an example of the vehicular terminal of the navigation apparatus, which is described in the first and second embodiments.

Further, the alphabetical search in the first and second embodiments may be replaced with a genre search. Though an alphabetical input screen is displayed for receiving the condition input via the manual operation input, how the input is received by the vehicular terminal is not limited to such example. For example, when a genre search screen is displayed for transitioning between layered configuration of different genres, the switching of the input method may be applied to the genre search screen, so that a user is able to continue to input information via voice recognition when the travel-related compulsory function is in effect.

Such changes and modifications are to be understood as being within the scope of the present disclosure as defined by the appended claims.

Further, a relationship between the configuration of the above embodiments and the elements in claims is provided as: the operation switch group 11 and the microphone 13 maybe referred to as "an input unit"; S106 and S108 maybe referred to as "an effectiveness determination unit"; S114 maybe referred to as "a first input reception switcher"; S110 maybe referred to as "a notification unit"; S112 maybe referred to as a "confirmation unit"; S120 maybe referred to as "an invalidation determination unit"; S122 maybe referred to as "a second input reception switcher"; S100, S200, or S204 maybe referred to as "a display controller"; S104 maybe referred to as "a first condition display unit"; and S116 maybe referred to as "a second condition display unit".

What is claimed is:

1. A vehicular terminal comprising:
an input unit receiving an input from an input method, the input method including a manual operation input performed by a manual operation and a voice recognition input performed by a voice recognition process;
an input restriction function restricting a reception of a condition by the manual operation input during a travel of a vehicle;
an effectiveness determination unit determining whether the input restriction function is put in effect during reception of the condition by the manual operation input;
a first input reception switcher switching the input method from the manual operation input to the voice recognition input to continue reception of the condition from the input unit when the effectiveness determination unit determines the input restriction function is in effect;
a notification unit notifying a user of continuing the input of the condition by enabling the voice recognition input when the effectiveness determination unit determines that the input restriction function is in effect; and
a confirmation unit receiving confirmation from the user of switching the input method from the manual operation input to the voice recognition input after the notifying of the user of the voice recognition input via the notification unit, wherein
when confirmation to switch the input method to the voice recognition input is received the first input reception switcher switches the input method from the manual operation input to the voice recognition input.

2. The vehicular terminal of claim 1 further comprising:
an invalidation determination unit determining whether the input restriction function is not in effect after the first input reception switcher switches the input method from the manual operation input to the voice recognition input, and
a second input reception switcher switching the input method from the voice recognition input to the manual operation input or maintaining the input method as the voice recognition input for continuing reception of the input of the condition when the invalidation determination unit determines the input restriction function is not in effect.

3. The vehicular terminal of claim 1 further comprising:
a plurality of display units; and
a display controller displaying on one of the plurality of display units an input screen for receiving the input by at least one of the manual operation input or the voice recognition input and displaying on another one of the plurality of display units a map screen.

4. The vehicular terminal of claim 1 further comprising:
a display unit; and
a display controller displaying on the display unit an input screen for receiving the input by at least one of the manual operation input or the voice recognition input, and displaying a map screen, wherein
the display controller switches from the input screen to the map screen when the effectiveness determination unit determines the input restriction function was put in effect during reception of the input of the condition by the manual operation input.

5. The vehicular terminal of claim 4, wherein
the display controller displays the condition, which is inputted by the input unit, in a first condition display area on the input screen when the condition is received by the manual operation input before the input restriction function is put in effect, and
the display controller displays the condition, which is inputted by the input unit, in a second condition display area on the map screen when the display controller switches from the input screen to the map screen and when the first input reception switcher has switched the input method from the manual operation input to the voice recognition input after the input restriction function is put in effect, the second condition display area displays the condition as it was displayed by the first condition display area and appends it with the inputs received by the voice recognition input.

6. A vehicular terminal comprising:
an input unit receiving an input from an input method, the input method including a manual operation input performed by a manual operation and a voice recognition input performed by a voice recognition process;
an input restriction function restricting a reception of a condition by the manual operation input during a travel of a vehicle;
an effectiveness determination unit determining whether the input restriction function is put in effect during reception of the condition by the manual operation input;
a first input reception switcher switching the input method from the manual operation input to the voice recognition input to continue reception of the condition from the input unit when the effectiveness determination unit determines the input restriction function is in effect;
a display unit; and
a display controller displaying on the display unit an input screen for receiving the input by at least one of the manual operation input or the voice recognition input, and displaying a map screen, wherein
the display controller switches from the input screen to the map screen when the effectiveness determination unit determines the input restriction function was put in effect during reception of the input of the condition by the manual operation input,
the display controller displays the condition, which is inputted by the input unit, in a first condition display area on the input screen when the condition is received by the manual operation input before the input restriction function is put in effect, and
the display controller displays the condition, which is inputted by the input unit, in a second condition display area on the map screen when the display controller switches from the input screen to the map screen and when the first input reception switcher has switched the input method from the manual operation input to the voice recognition input after the input restriction function is put in effect, the second condition display area displays the condition as it was displayed by the first condition display area and appends it with the inputs received by the voice recognition input.

7. The vehicular terminal of claim 6 further comprising:
a notification unit notifying a user of continuing the input of the condition by enabling the voice recognition input when the effectiveness determination unit determines that the input restriction function is in effect.

8. The vehicular terminal of claim 7 further comprising:
a confirmation unit receiving confirmation from the user of switching the input method from the manual operation input to the voice recognition input after notifying the user of the voice recognition input via the notification unit, wherein
when confirmation to switch the input method to the voice recognition input is received, the first input reception switcher switches the input method from the manual operation input to the voice recognition input.

9. The vehicular terminal of claim 6 further comprising:
an invalidation determination unit determining whether the input restriction function is not in effect after the first input reception switcher switches the input method from the manual operation input to the voice recognition input, and
a second input reception switcher switching the input method from the voice recognition input to the manual operation input or maintaining the input method as the voice recognition input for continuing reception of the input of the condition when the invalidation determination unit determines the input restriction function is not in effect.

* * * * *